Nov. 12, 1935.   G. J. FOWLER   2,021,122
APPARATUS AND METHOD FOR SEPARATING SOLIDS FROM LIQUIDS
Original Filed Aug. 29, 1927   2 Sheets-Sheet 1
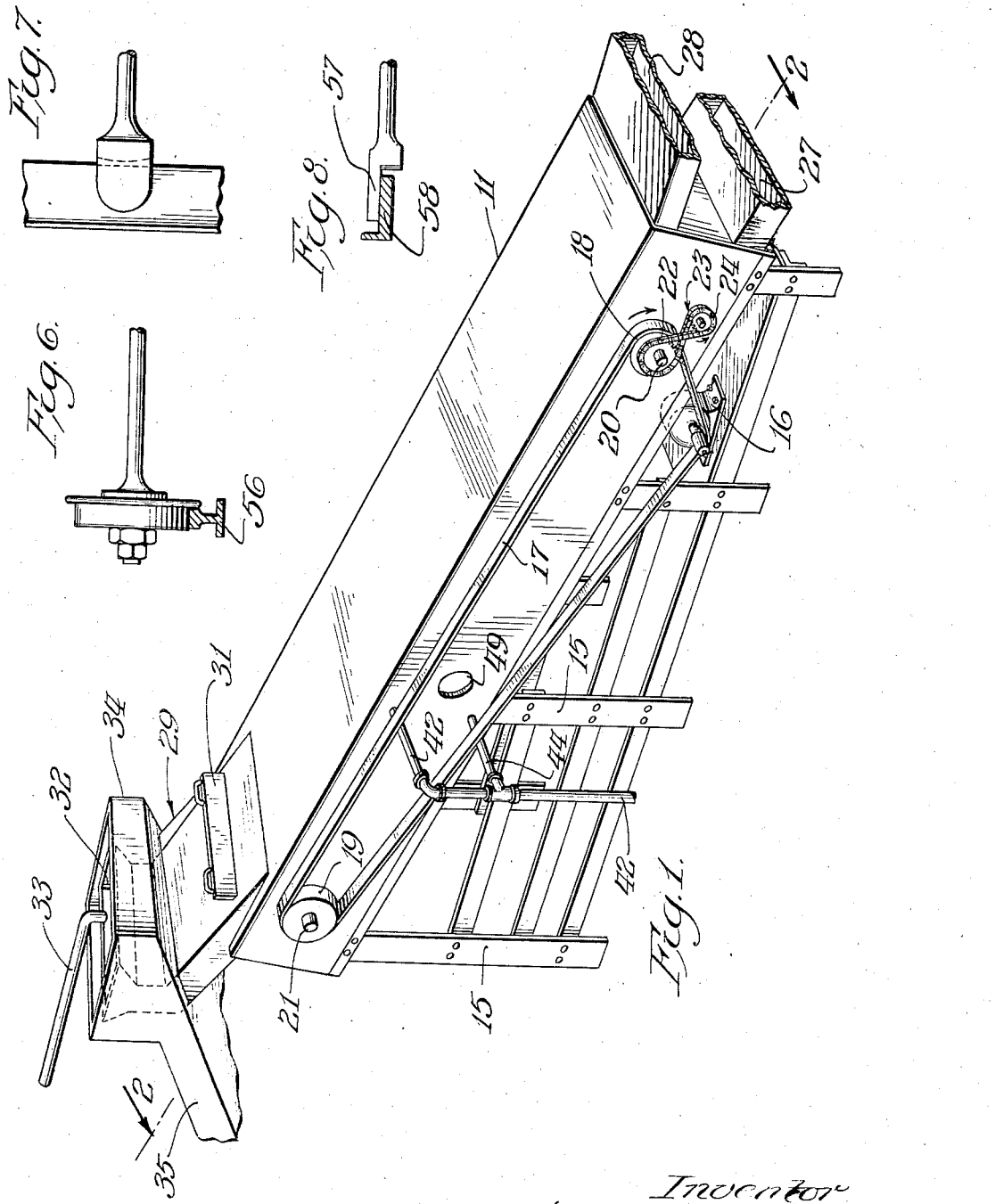
Inventor
Gilbert J. Fowler
By Williams, Bradbury,
McCaleb & Hinkle
Attys.

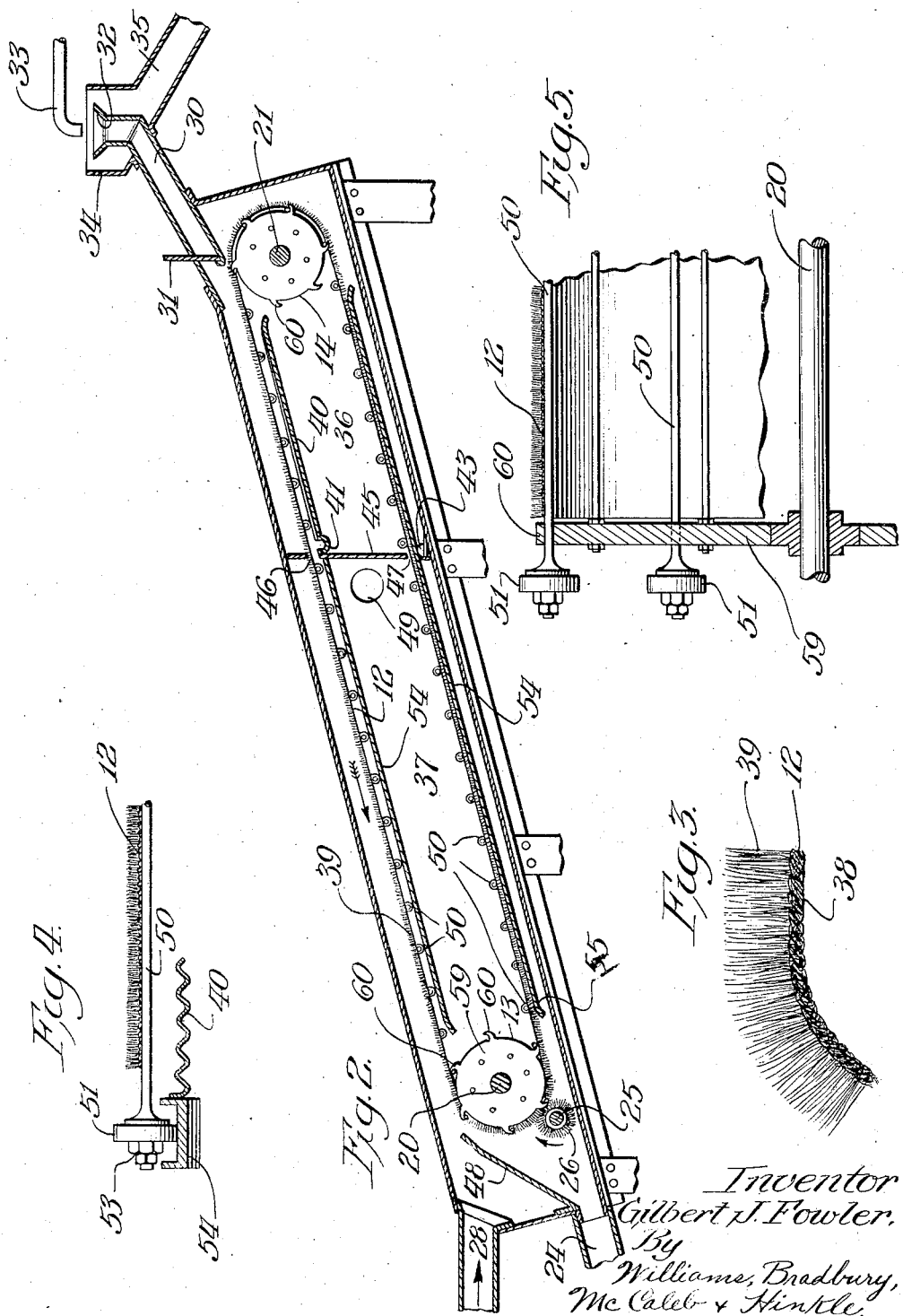

Patented Nov. 12, 1935

2,021,122

UNITED STATES PATENT OFFICE 2,021,122

APPARATUS AND METHOD FOR SEPARATING SOLIDS FROM LIQUIDS

Gilbert John Fowler, Bangalore, India

Original application August 29, 1927, Serial No. 216,117. Divided and this application May 16, 1932, Serial No. 611,499

23 Claims. (Cl. 210—198)

The present invention relates to an improved apparatus for separating solids from liquids, which is particularly efficacious for the separation of flocculent sludge obtained in the disposal of sewerage. The filter element per se forms the subject of my prior application, Serial No. 216,117, filed August 29, 1927, of which this application is a division, and the improved process of utilizing the features of the filter element forms the subject of my co-pending application, Serial No. 611,500, filed May 16, 1932. In order to illustrate the invention, reference will be had by way of example to the treatment of sludge resulting from sewerage processes, but the invention is of general application, and I do not wish to limit it to any particular use.

By the activated sludge treatment, large quantities of sewerage, consisting of about 97% water, 1% inorganic matter and 2% organic matter, such as carbohydrates, fats, albuminous matter, urea, et., are mixed with a smaller quantity of sludge which has been activated by a prior treatment, and this mixture is subjected to a treatment with air bubbles whereby the bacteria cause the nitrification or oxidation of the organic solids to yield forms of ammonia, nitrates, acids, etc., thus converting a large proportion of the sewerage into soluble compounds and causing the remaining portion to coagulate into a flocculent sludge.

The solid matter resulting from this treatment contains matter which is very valuable as a fertilizer, the activated sludge treatment rendering the solids even more valuable because atmospheric nitrogen is actually absorbed from the air and stored by the organisms in the above treatment. From the point of view of the value of the manure or fertilizer, it is vital that it should not be overheated or treated with chemicals; e. g., with acid, if this can be avoided. Overheating tends to render the nitrogen less "available" and the addition of acid cannot be of benefit to the product.

The nature of the solids, however, renders them extremely difficult to filter. The finely-divided matter, which is in the deflocculated form, will tend to pass through an ordinary filter and clog its pores. Screens and sand filters have been usually used for this purpose but the action is very slow, the filter becomes clogged, the separation is not thorough, and the filter is not readily cleaned.

The object of my invention is to provide a means for filtering such a sludge, whereby these difficulties may be overcome.

A further object is to accomplish rapid drying at low temperature to avoid injuring the value of the resulting fertilizer.

Another object is to provide an improved filtering system and means for removing the residue therefrom.

Another object is to separate well-conditioned sludge from sludge of indifferent quality so that the latter may be returned for further treatment.

Another object is to provide a method and means for drying the residue on the filter by means of air currents.

Another object is to provide a continuous process wherein the filter is conditioned prior to its use by passing it through a moisture chamber.

Another object is to provide improved means for removing the filtrate from a filter of this nature.

Another object is to reduce the cost of filtering and drying so that the fertilizer may be commercially profitable.

Another object is to provide improved apparatus for carrying out my process.

Other objects will appear as the detailed description of my invention proceeds.

In the accompanying drawings which illustrate a preferred embodiment of my apparatus and in which similar reference characters relate to similar parts throughout, Fig. 1 is a perspective view showing the driving means, the supports, the casing, etc.

Fig. 2 is a vertical section of the casing shown in Fig. 1, showing the arrangement of the filter mat.

Fig. 3 is an enlarged detail showing the general structure of the filter mat.

Fig. 4 is a detail of the mat support, its roller, roller support, and corrugated drain.

Fig. 5 is a detail showing the construction of the pulley, over which the filter belt is trained.

Fig. 6 is a detail showing another modification of a belt supporting roller.

Figs. 7 and 8 are horizontal and vertical details of still another modification of a belt support.

Referring to Figs. 1 and 2, a suitable casing 11 encloses a brush mat filter 12 in the form of a belt which is driven by pulleys 13 and 14 in a counterclockwise direction, as shown in Fig. 2. The casing may be of wood, metal or any other suitable structure and in some cases may be omitted entirely, its function being to maintain the warm air in contact with the sludge on the filter. The casing is provided with a suitable support 15 on which may be mounted a motor 16 equipped with a driving belt or chain 17 for synchronously driving pulleys 18 and 19, secured to shafts 20 and 21, respectively, on the outside of the casing.

By providing a positive drive for these shafts, pulleys 13 and 14, which are also keyed to shafts 20 and 21, respectively, are positively driven at the same speed, so that there will be no tendency to stretch the mat and increase the distance between the supporting bars, as will be further explained.

Keyed to shaft 20 on the outside of the casing (Fig. 1) is a pulley 22, over which a crossed belt 23 is trained to drive pulley 24, keyed to shaft 25, to which is also keyed a roller 26, the function of which will be set forth below.

The lower part of the lower end of the casing is provided with an outlet 27 and the upper part of this end is provided with an inlet 28 for a drying gas, such as heated air. The motor for driving the pulleys may be also used to operate a compressor for forcing air into the chamber through opening 28. Also, a suitable heater may be installed for warming the drying gas. The compressor and heating means (not shown in the drawings) may be of any conventional type.

At the other end of the casing 11 there is provided an inlet penstock 29, including a chute 30 and a sluice-gate 31, which is adapted to be adjusted to vary and distribute the amount of sludge delivered to the filter mat. The upper end of the chute is provided with a hopper 32, adapted to receive sludge from the sludge delivery pipe 33. Around hopper 32 and extending above its uppermost limit is an overflow funnel 34, adapted to carry away any of the sludge running over the top of hopper 32. A pipe 35 carries the overflow sludge back to its original source, from whence it is pumped again to the chute. By this means, a constant head and a continuous and evenly-distributed flow of the sludge on the filter mat is obtained.

The casing 11 surrounding the filter belt is divided into two compartments, a moisture chamber 36 and a drying chamber 37. Pulleys are mounted on these two chambers, as heretofore explained, and a fiber mat filter belt is trained over these pulleys so that it receives the sludge in the moisture chamber, allows the water to drain off therein, carries the residue on the filter through the driving chamber, deposits the dried residue at the lower end of the chamber, and returns through the moisture chamber to repeat the cycle.

The brush mat filter is preferably of coir, such as is used for high-class door mats, the surface of which is composed of the ends of innumerable, vertical fibers. A detail of the mat 12 is shown in Fig. 3, wherein the base portion 38 is shown as a woven mat supporting innumerable, vertical fibers 39. The material of which the mat and vertical fibers are composed may be coir, cocoanut fiber, hemp, vegetable fiber, hair, metal wires, etc., it being only necessary that the filter be unaffected by the substance to be filtered. In any event, the innumerable, vertical fibers constitute virtually a stream-line filter composed of a countless number of vertical channels, whereby the draining effect is enormously intensified.

An important feature of a filter of this type is the fact that it does not become clogged by the deflocculated or colloidal matter carried by the liquid. Particles which are too small to be retained by the filter pass through it with the fluid. This feature is especially advantageous in the treatment of activated sludge because it retains all of the properly "conditioned" sludge and allows the portion of sludge which has not been sufficiently aerated to be returned for re-treatment. This avoids the necessity of treating the whole batch for an extended period of time to thoroughly complete the reaction; that is, where it has heretofore been necessary to aerate the sludge for an extended period, it will now require a much less period because any of the sludge which has escaped treatment may be easily filtered and re-treated.

Another important feature of this filter is the fact that the residue may be easily removed and the filter readily cleaned in an extremely simple manner. Reference to Fig. 3 will show that, when the mat is flexed around the pulley, the fibers will be separated and the dried particles held thereon will be easily dislodged. To make this removal more thorough, I have provided a roller brush 26 which is mounted to revolve in the same direction and to have a peripheral speed about the same as that of the belt. This acts to thoroughly sweep the opened fibers and remove all of the residue therefrom. By this treatment there are no pores to become clogged and there is no tendency to drive the substance to be removed into the pores of the filter as is the case with ordinary filter cloths. By my improved process, I am able to use the same filter continuously for an extended period of time without decrease in filter efficiency, even when the material is a gelatinous mud or precipitate.

It has been found that with certain types of brush mat filters, such as the type used for ordinary door mats, a perfectly dry surface does not give satisfactory results, because the wet precipitate tends to run off the surface, like mercury. It is necessary for the mat to be damp if the sludge is to spread evenly over the surface and to be properly filtered. To accomplish this purpose I have arranged my apparatus whereby the filter mat 12 is passed through a portion of the moisture chamber 36 on its return to the inlet chute, whereby the filter is re-conditioned (moistened) and prepared to receive another batch of the sludge.

The means for carrying away the filtrate in chamber 36 is preferably a sheet of corrugated, galvanized iron 40 in which the channels or corrugations are slightly inclined longitudinally to allow the water to readily flow into trough 41, whence it is conducted by pipe 42 (Fig. 1) to a re-treatment tank not shown. Since moisture may condense in chamber 36, I have provided another trough 43, connected by pipe 44 to pipe 42, whereby this moisture is also removed and prevented from flowing down the casing to come in contact with the dried residue.

The moisture chamber 36 is separated from the drying chamber 37 by a plate 45, which plate must necessarily have openings at 46 and 47 through which the belt may pass.

The lower part of the casing which comprises drying chamber 37 is provided with an inlet 28 for heated air. A baffle-plate 48 prevents the heated air from escaping through the outlet 27 and directs it along the upper surface of the belt. The countercurrent principle is applied; that is, the dry air comes in contact with the material nearest pulley 13, and as the air becomes more saturated, it comes in contact with residue which contains more moisture. The structure of the fiber mat filter holds the residue in suspension to allow air to circulate freely above and below it whereby drying is accomplished most rapidly.

An exit port 49 is provided in the casing at the upper end of the drying chamber 37 so that these gases may be carried, together with their moisture, from the system. This port also serves as an exit for moisture introduced into chamber 37 by air circulating through chamber 36.

Various means may be used for supporting the mat. In Figs. 2, 4 and 5, I have shown steel bars 50, spaced at intervals throughout the length of the belt, and secured thereto in any suitable manner. These bars are provided at each end with suitable rollers 51, rotatably mounted thereon, and held in place by suitable washers 52 and locknuts 53. These rollers are adapted to travel in and be supported by channels 54 which are inclined at 55 to form an approach for the rollers.

The supporting rollers 51 may be flanged as shown in Fig. 6, and adapted to travel on rails 56 instead of channels. Instead of rollers, sliding contacts 57 may be used to coact with a suitable slide 58, as shown in Figs. 7 and 8.

The pulleys 13 and 14 comprise two discs 59 held in fixed position relative to each other by spacing bars 59a rigidly secured thereto. Spaced lugs 60 are carried by these pulleys and are adapted to catch the supporting rods 50 between the rollers 51 and the brush mat 12, as shown in Fig. 5. Should the belt become stretched for any reason, the distance between rods 50 would be increased and would not accurately register with the distance between lugs 60 on discs 59. To prevent this, I may mount the filter mat on suitable metallic mesh, or I may provide means for holding the bars 50 equally spaced from each other. This means per se does not constitute a part of my invention and needs no further description.

While I have described a preferred embodiment of my invention, it is understood that various other embodiments might suggest themselves to anyone skilled in the art. For instance, instead of arranging the filter as an endless belt on pulleys, the filter mats may be arranged in vertical layers, with corrugated iron sheets therebetween and a drying gas may be introduced at intervals.

If the atmospheric conditions and the climate permit, my filters may be arranged in the open and exposed to the atmosphere. In this case, a continuous belt may be used, as in Figs. 1 and 2, or sheets of filter mat may be arranged on suitable drains which are not necessarily limited to corrugated iron sheeting but may consist of loosely piled rocks or any other conventional means for rapidly carrying away the water.

One of the most important features of the invention is the use of an improved filter and drying means and an improved apparatus and method for utilizing this filter, and while I have described in detail an application of this to activated sludge, it is understood that the invention applies equally to all processes wherein a solid of this nature must be removed from a liquid. My invention applies especially wherever filter cloths have been used heretofore, in centrifugal machines, etc.

The expression "brush mat", as used in this specification and in the following claims, is not limited to vegetable fibers or bristles but includes any type or means wherein the supporting surface is composed of the ends of innumerable upstanding fibers, the fibers consisting of coir, wood, reeds, grass, hair, metal wires, etc.

The important features of the invention which contribute in a great measure to the new and useful results accomplished are the use of the improved filter having the multiplicity of outwardly projecting bristles located sufficiently close together to form a supporting surface at the ends of the bristles for supporting the major portion of the solid material separated by said filter. Such a filter effects a quick separation of the liquid on account of the stream-line flow of the liquid down the bristles and effects quick drying of the solids on account of the access of air to the space below the solids. The bristles are readily separable and permit the solids to contract and crack into flakes on drying, which facilitates the separation of the solids from the filter, and the present methods and apparatus permit the use of very low temperatures in drying, which prevent any damage to useful ingredients of the solids.

The invention is of particular importance in the filtration of slimes or other solid mixtures, including solids in sugar factories and in the separation of solids from oils.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. Filtering and drying apparatus including an endless belt of brush mat material provided with upturned fibers, supporting and driving means for said belt, a moisture chamber enclosing one end of the belt, means for evenly distributing a mixture of fluids and solids on the portion of the belt in the moisture chamber, drain means in said moisture chamber, a drying chamber enclosing the other end of the belt, means for causing a counter-current of drying gas to flow through said drying chamber, and means for flexing the mat in the drying chamber for disengaging the solid matter.

2. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying chamber, and means for subjecting the solids on said belt to a drying atmosphere.

3. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying chamber, means for subjecting the solids on said belt to a drying atmosphere, and means for remoistening said belt after the drying operation to recondition the belt for the filtering operation.

4. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying chamber, means for subjecting the solids on said belt to a drying atmosphere, and means for bending the belt about a curved surface to separate the bristles and break the dried solid carried by the ends of the bristles.

5. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying chamber, means for subjecting the solids on said belt to a drying atmosphere, means for bending the belt about a curved surface to separate the bristles and break the dried solid carried by the ends of the bristles, and a rotating brushing device for engaging said bristles at the point of their separation to effect a cleaning of the filter.

6. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying chamber, and means for subjecting the solids on said belt to a drying atmosphere, said drying atmosphere flowing in a direction contrary to the movement of said belt whereby the material which has progressed farthest along said belt is subjected to the driest atmosphere.

7. In an apparatus for separating liquids from solids, the combination of a filter comprising a belt having a flexible base and a multiplicity of projecting bristles located sufficiently close together to form a supporting surface for the major portion of the solid material to be separated by said filter, means for supporting said belt for progressive movement in the direction of its length, means for enclosing said belt in a drying member, means for subjecting the solids on said belt to a drying atmosphere, means for bending the belt about a curved surface to separate the bristles and break the dried solid carried by the ends of the bristles, a rotating brushing device for engaging said bristles at the point of their separation to effect a cleaning of the filter, and means for remoistening said belt after separating the solid from said belt to recondition the belt for a subsequent filtering operation.

8. An apparatus for the separation of solids and liquids comprising a woven filter formed of fibers of coir having a multiplicity of outwardly projecting bristles, the bristles being located sufficiently close together to form a supporting surface located adjacent the ends of the bristles for supporting the major portion of the solid material to be separated by said filter, means for applying sludge or the like to said filter on the ends of said bristles, said filter being arranged for stream-line flow of liquid along the bristles to effect a quick separation, and means for subjecting said filter to a drying atmosphere above said solids on said bristles and in between the bristles underneath said solids.

9. An apparatus for the separation of solids and liquids comprising a filter having stiff fibers projecting at right angles to the body of the filter, said fibers being sufficiently close together and sufficiently numerous to form a supporting surface located at the ends of the fibers for supporting the major portion of the solid material to be separated by said filter, means for applying sludge or the like to the filter at the ends of said bristles, said filter being arranged for stream line flow of the liquid along the bristles to effect a quick separation, and means for subjecting the filter and solids to a dry atmosphere by circulation of air above said solids on said bristles and below said solids in between the bristles supporting said solids.

10. In an apparatus for separating sewage sludge from liquid and for drying the sludge, the combination of an endless belt comprising a flexible base and a multiplicity of elongated stiff fibers projecting from said base, said fibers projecting at substantially right angles to said flexible base and being sufficiently numerous and close together to form a support for residue at the ends of said fibers, movable supports for said endless belt comprising a curved member about which said belt passes, the said fibers being of substantial length in proportion to the radius of said curved member so that the loose ends of said fibers are widely separated as said belt passes about said curved member to break up the cake of residue carried at the ends of said fibers, and a rotating brush mounted on said apparatus and having bristles sweeping the separated and projecting fibers of said belt whereby said brush is adapted to lift the dried and broken residue from said fibers, a housing enclosing said endless belt, said housing being divided into a filtering chamber and a drying chamber, means for spreading sludge uniformly on said belt at the one end of said filtering chamber, means for gathering and conducting away the liquid filtering through said belt and means for introducing a drying atmosphere into said drying chamber to dry the residue on said belt before it progresses to said brush.

11. In an apparatus for separating sewage sludge from liquid and for drying the sludge, the combination of an endless belt comprising a flexible base and a multiplicity of elongated stiff fibers projecting from said base, said fibers projecting at substantially right angles to said flexible base and being sufficiently numerous and close together to form a support for residue at the ends of said fibers, movable support for said endless belt comprising a curved member about which said belt passes, the said fibers being of substantial length in proportion to the radius of said curved member so that the loose ends of said fibers are widely separated as said belt passes about said curved member to break up the cake of residue carried at the ends of said fibers, and a rotating brush mounted on said apparatus and having bristles sweeping the separated and the projecting fibers of said belt whereby said brush is adapted to lift the dried and broken residue from said fibers, a housing enclosing said endless belt, said housing being divided into a filtering chamber and a drying chamber, means for spreading sludge uniformly on said belt at the one end of said filtering chamber, means for gathering and conducting away the liquid filtering through said belt, and means for introducing a drying atmosphere into said drying chamber to dry the residue on said belt before it progresses to said brush, and means for remoistening the fibers of said belt after removal of the dried sludge and before the placing of wet sludge on said belt.

12. The method of continuously filtering a flocculent sludge on a mat filter which comprises flowing the sludge on the upturned fibers of the mat, draining off the fluid, subjecting the mat with its residue to a drying atmosphere, removing the residue from said mat, subjecting the mat to moisture whereby it is reconditioned, and repeating the cycle.

13. The method of filtering which comprises distributing the mass to be filtered on the ends of a multiplicity of vertical fibers of a brush mat, said fibers being arranged at substantially right angles to the body of the mat, whereby an intensified streamline filter effect is produced, removing the filtrate by a plurality of channels adjacent to said brush mat, and drying the material on the mat before removing it therefrom.

14. The method of filtering and drying a flocculent sludge which comprises flowing it on the upturned fibers of a brush mat belt, said fibers being arranged at substantially right angles to the body of the filter, and draining the fluid and deflocculated sludge therefrom, passing the filtered mass on the belt through a drying atmosphere by passing a heated counter-current of a drying gas over it, and removing it from the belt while the belt is curved sharply to break the dried sludge.

15. The method of treating sewage which comprises mixing it with a small portion of activated sludge, supplying air to cause the nitrification, oxidation and flocculation of the sludge, filtering through a brush mat filter, said filter including fibers projecting at substantially right angles to the body of the filter, drying while on the mat, and removing the resulting fertilizer from the mat.

16. The method of separating solids from liquids with a bristle filter which comprises spreading a layer of sludge or the like upon a filter having a multiplicity of projecting bristles located sufficiently close to each other, and arranged at substantially right angles to the body of the filter, to form a supporting surface for solids, passing the liquids through said filter in substantially the direction of the bristles, retaining the solids at the ends of the bristles, and subjecting the solids to a drying atmosphere outside of the bristles and between the bristles.

17. The method of separating solids from liquids with a bristle filter which comprises spreading a layer of sludge or the like upon a filter having a multiplicity of projecting bristles located sufficiently close to each other, and arranged at substantially right angles to the body of the filter, to form a supporting surface for solids, passing the liquids through said filter in substantially the direction of the bristles, retaining the solids at the ends of the bristles, and subjecting the solids to a drying atmosphere, bending the filter to cause the bristles to spread, and brushing the bristles to separate the solids therefrom.

18. The method of separating solids from liquids with a bristle filter which comprises spreading a layer of sludge or the like upon a filter having a multiplicity of projecting bristles located sufficiently close to each other, and arranged at substantially right angles to the body of the filter, to form a supporting surface for solids, passing the liquids through said filter in substantially the direction of the bristles, retaining the solids at the ends of the bristles, and subjecting the solids to a drying atmosphere, bending the filter to cause the bristles to spread, brushing the bristles to separate the solids therefrom, and moistening said filter to recondition the filter for a subsequent filtering operation.

19. The method of separating solids from liquids with a bristle filter which comprises spreading a thin layer of sludge or the like upon a filter having a multiplicity of projecting bristles located sufficiently close to each other and arranged at substantially right angles to the body of the filter to form a supporting surface for solids, passing the liquids through said filter in substantially the direction of the bristles and retaining the solids at the ends of the bristles, causing the filter to progress along the direction of its length and subjecting the filter to a drying atmosphere, the atmosphere flowing in the direction contrary to the progression of the filter to subject the solids which have progressed farthest to the driest atmosphere.

20. The method of separating solids from liquids which comprises spreading a thin layer of sludge or the like upon a filter comprising the ends of a multiplicity of stiff projecting bristles disposed at substantially right angles to the plane of a supporting body, said bristle ends forming a supporting surface and being sufficiently close together to support the solids, passing the liquids through said filter in substantially the direction of the bristles and retaining the solids at the ends of the bristles, drying the solids by circulation of air above the solids and between the bristles below the solids and separating the solids from the filter by bending the filter about a sharp bend to separate the bristles and sweeping the solids off the ends of the bristles from below the end of the bristle outwardly toward the end of the bristle.

21. A method of drying flocculent sludge which comprises distributing the sludge on a filter provided with a multiplicity of vertically extending fibers of substantially the same length, the ends of said fibers forming a substantially plane supporting surface, and said fibers being arranged at substantially right angles to the body of the filter, drying the sludge on said filter, bending said filter about a curved surface with the bristles projecting radially outward from said curved surface, the dried sludge at the ends of the bristles cracking, and mechanically removing the dried sludge particles from the ends of the bristles.

22. A method of separating flocculent sludge which comprises distributing sludge on a filter provided with a multiplicity of vertically extending fibers of substantially the same length, the ends of said fibers forming a substantially plane supporting surface, said fibers being arranged at substantially right angles to the body of the filter and being of substantial length so that the ends of the fibers will be spread upon bending of the filter, drying the sludge on said filter, bending said filter about a curved surface with the bristles projecting radially outward from said curved surface, said bristles being sufficiently stiff to hold the dried sludge spaced from the body of the filter, said sludge cracking as the ends of the bristles spread, and mechanically removing the dried sludge particles from the ends of the bristles.

23. The method of drying flocculent sludge which comprises spreading a thin layer of sludge on the surface formed by the ends of a multiplicity of coir fibers of a mat, said fibers extending at substantially right angles to the body of the mat and being of substantially the same length, the water draining along a stream line formed between the fibers, and drying said sludge while supported at the ends of said fibers.

GILBERT JOHN FOWLER.